(12) United States Patent
Dear

(10) Patent No.: US 8,577,723 B2
(45) Date of Patent: Nov. 5, 2013

(54) EVENT DEMAND SYSTEM AND METHOD

(75) Inventor: Brian Dear, La Jolla, CA (US)

(73) Assignee: Eventful, Inc., San Diego, CA (US)

( * ) Notice: Subject to any disclaimer, the term of this patent is extended or adjusted under 35 U.S.C. 154(b) by 1171 days.

(21) Appl. No.: 11/495,040

(22) Filed: Jul. 28, 2006

(65) Prior Publication Data

US 2008/0046913 A1 Feb. 21, 2008

(51) Int. Cl.
*G06Q 30/00* (2012.01)

(52) U.S. Cl.
USPC .............................. 705/14.4; 705/7.31; 705/5

(58) Field of Classification Search
USPC ........................................... 705/14.4, 7.31, 5
See application file for complete search history.

(56) References Cited

U.S. PATENT DOCUMENTS

| | | | |
|---|---|---|---|
| 7,363,267 B1 * | 4/2008 | Vincent et al. ................. | 705/37 |
| 7,865,424 B2 * | 1/2011 | Pappas et al. .................. | 705/37 |
| 2002/0016729 A1 * | 2/2002 | Breitenbach et al. ............ | 705/9 |
| 2003/0004773 A1 * | 1/2003 | Clark et al. ........................ | 705/8 |
| 2005/0033615 A1 * | 2/2005 | Nguyen et al. ................... | 705/5 |
| 2005/0038690 A1 * | 2/2005 | Hayes-Roth ...................... | 705/9 |
| 2005/0209914 A1 | 9/2005 | Nguyen et al. | |
| 2006/0271462 A1 | 11/2006 | Harmon | |
| 2006/0277130 A1 * | 12/2006 | Harmon .......................... | 705/35 |
| 2007/0143185 A1 * | 6/2007 | Harmon et al. .................. | 705/14 |

FOREIGN PATENT DOCUMENTS

| | | |
|---|---|---|
| WO | 0079361 A2 | 12/2000 |
| WO | WO 0075838 A1 * | 12/2000 |
| WO | 0198933 A1 | 12/2001 |

OTHER PUBLICATIONS

Web article on *Public Mind beta*; http://www.smartmobs.com/archive/2004/07/02/public_mind_bet.html.
Website of Demand ID Systems describing TourVote http://www.demandid.com.
Supplementary European search report dated Dec. 19, 2011 for corresponding European application 07810799.
Communication from the Examining Division (Office Action) dated May 2, 2013, in European counterpart application (EP2070032).

* cited by examiner

*Primary Examiner* — Michael Bekerman
(74) *Attorney, Agent, or Firm* — DLA Piper LLP (US)

(57) ABSTRACT

A system and method for event demand creation and event organization is provided in which an interested party can create a demand for an event at a particular location and then encourage other people to join the demand. Once the demand reaches critical mass, the event provider is notified of the demand and asked to agree to the demanded event.

20 Claims, 11 Drawing Sheets

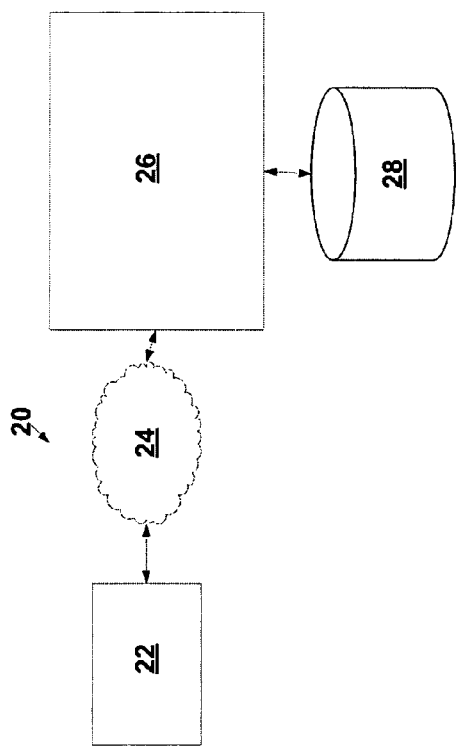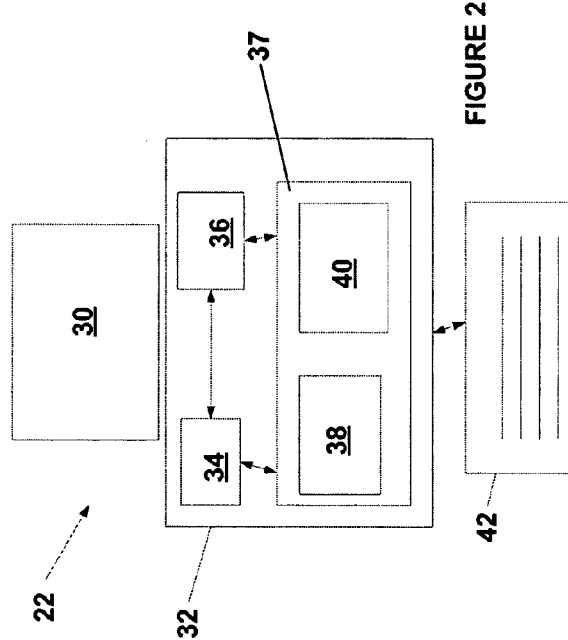

EVENT DEMAND SYSTEM AND METHOD

FIELD OF THE INVENTION

The invention relates generally to a system and method for measuring the demand for an event.

BACKGROUND OF THE INVENTION

Systems exist that permit a user to collect signatures for on-line petitions. For example, see www.petitiononline.com. These systems permit signatures to be collected, but do not attempt to determine the demand for an event nor provide communications between an event source and the audience to set up and schedule an event once sufficient demand for an event is determined. Systems also exist that permit users to collaborate with each other about a common topic. An example of such a web site was www.publicmind.com which is no longer active. Systems also exist (www.demandid.com) that attempt to gauge the demand of an audience for live musical performances. This system has a TourVote feature that permits a user to register an interest in a particular musical artist. This system does not, however, provide a communications link between the audience, venue owner and performer so that the performance can be scheduled by the system once sufficient demand is shown. Thus, it is desirable to provide an event demand system and method and it is to this end that the present invention is directed.

SUMMARY OF THE INVENTION

A system and method for event demand is provided that measures the demand (an interest level) for an event in a particular location by an audience and then provides a communications link to the event provider (including a venue owner) once sufficient demand is shown so that the system facilitates the scheduling of an event. The event may include various different activities including, but not limited to, musical concerts, a sporting event, a vote/tally, a book reading, a lecture, an appearance by a particular person, a gathering of a particular group of people, such as a group interested in a particular subject, a particular action, such as the recall/impeachment of a political figure, and any other activities in a particular location.

The event demand system is a tool designed for both an interested party who are one or more users who have a new demand/want to participate in an existing demand as well as an event provider who seek a public audience for the event. An example of a website that embodies a portion of the event demand system is the Eventful.com website. As a tool for the interested party, the system enables users to request desired events to happen in a specified location. The interested parties may start a new demand (a demand for a new event and/or in a new location) or join an existing demand that has already been started. Once an interested party starts a demand or joins one, the interested party's task is to enlist other members of the public who would also like this event to happen, and encourage them to join the demand as well. Similarly, those other interested parties are encouraged to spread the word about the demand and enlist even more people to join, thus creating a viral, grass-roots "campaign." When the demand has reached a certain size (achieved a critical mass or a sufficient level of demand), and the event provider is not already aware of the demand, the company contacts the appropriate agent/representative of the event provider (and/or the actual performer directly if the event is a performance) and makes them aware of this demand and any other demands (possibly in different locations or any different times). The event provider is then encouraged to get involved by communicating with the users making the demand, for example, to specify what the requirements would have to be for the performer to agree to do an event in that location. As a tool for an event provider, the demand system enables event providers to announce to their fans that the event provider wants the fans to indicate where they should perform, and with what type of events (concerts, lectures, interviews, book signings, outdoor activities, etc).

As a tool for the event provider, the system enables event providers to embed code on their own websites to invite the public to "demand" events to happen. For example, book authors or musicians who have websites for their fans, can use the system to encourage fans to "demand" the authors or musicians to come to a fan's town for a reading or performance.

BRIEF DESCRIPTION OF THE DRAWINGS

FIG. 1 is a block diagram of an example of an implementation of an event demand system in accordance with the invention;

FIG. 2 is a block diagram of an example of a computing device that is part of the event demand system in FIG. 1;

FIG. 4 is an example of a home page of a web-based system that may include an event demand system;

FIG. 11 illustrates an example of a demand detail page; and

FIG. 12 illustrates an example of a demand join page.

DETAILED DESCRIPTION OF A PREFERRED EMBODIMENT

Figure 3:
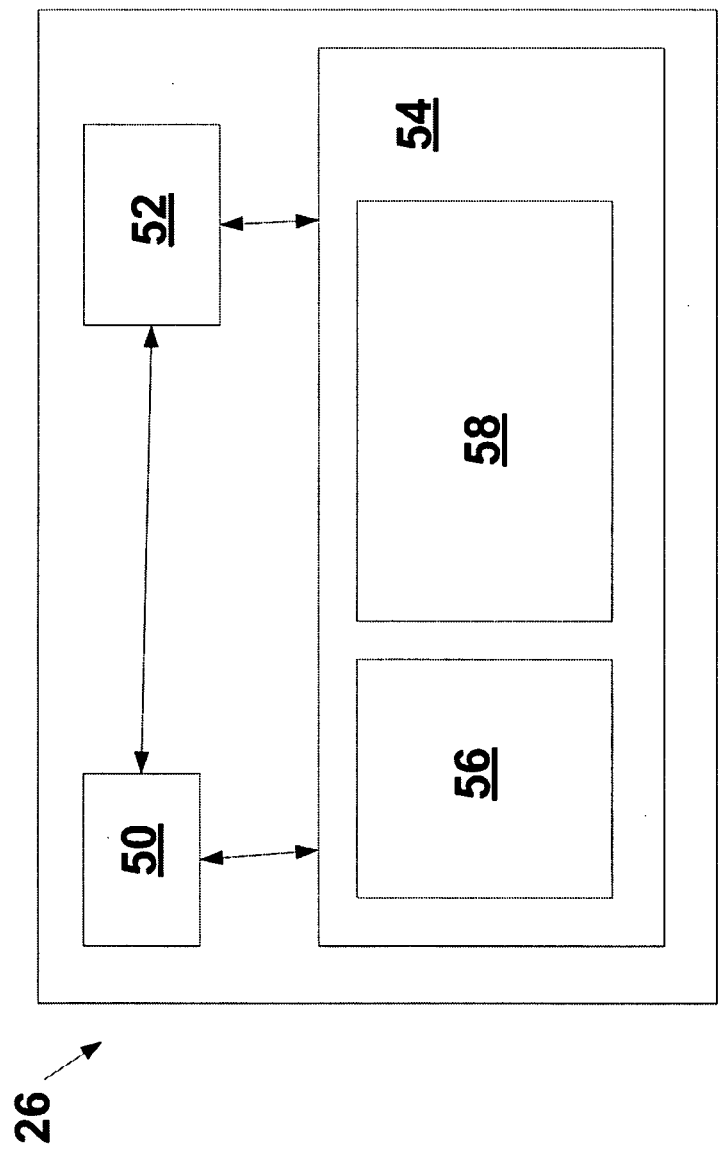
FIG. 3 is a block diagram of an example of a event main unit that is part of the event demand system in FIG. 1.

The invention is particularly applicable to a web-based event demand system and method and it is in this context that the invention will be described. It will be appreciated, however, that the system and method in accordance with the invention has greater utility since the system may be implemented using other computer architectures and computer-based systems.

A system and method for event demand is provided that measures the demand (an interest level) for an event in a particular location by an audience and then provides a communications link to the event provider (including venue owners) once sufficient demand is shown so that the system facilitates the scheduling of an event. The event may include various different activities including, but not limited to, musical concerts, a sporting event, a vote/tally, a book reading, a lecture, the screening of a film or video, an appearance by a particular person (such as an athlete, author, actor, musician, speaker, industry leader, comedians, poets, personalities, etc.), a gathering of a particular group of people, such as a group interested in a particular subject, a particular action, such as the recall/impeachment of a political figure, and any other activities in a particular location.

The event demand system is a tool designed for both an interested party who are one or more users who have a new demand/want to participate in an existing demand as well as an event provider, such as a band, an organizer of an event, an author, a venue owner, a filmmaker, an athlete, a musician, a speaker, an industry leader, a comedian, a poet, a personality, etc., who seek a public audience for the event. As a tool for the interested party, the system enables Eventful.com web site users to request desired events to happen in a specified location. The interested parties may start a new demand (a demand for a new event and/or in a new location) or join an existing demand that has already been started. Once an interested party starts a demand or joins one, the interested party's task is to enlist other members of the public who would also like this event to happen, and encourage them to join the demand as well. Similarly, those other interested parties are encouraged to spread the word about the demand and enlist even more people to join, thus creating a viral, grass-roots "campaign." When the demand has reached a certain size (achieved a critical mass or a sufficient level of demand), the company contacts the appropriate agent/representative of the event provider (and/or the actual performer directly if the event is a performance) and makes them aware of this demand and any other demands (possibly in different locations or any different times). The event provider is then encouraged to get involved by communicating with the users making the demand, for example, to specify what the requirements would have to be for the performer to agree to do an event in that location. As a tool for an event provider, the demand system enables event providers to announce to their fans that the event provider wants the fans to indicate where they should perform, and with what type of events (concerts, lectures, interviews, book signings, outdoor activities, etc).

FIG. 1 is a block diagram of an example of an implementation of an event demand system 20 in accordance with the invention which is a web-based client server type architecture. The system may include one or more computing devices 22 that are able to communicate over a link 24 to an event unit 26 that is coupled to a data storage unit 28. The one or more computing devices 22 are used by one or more interested party(s) to create a new demand and/or join an existing demand for an event at a particular location. The event unit interacts with the computing devices to display a user interface to the computing devices, store the information about each demand for a particular event in the data storage unit 28 and perform other event demand functions as described below in more detail. Each computing device 22 may be a laptop computer, desktop computer, PDA, mobile phone, wireless email device, set-top cable/satellite boxes, digital video recorder (DVR) devices such as TiVo or any other processing unit based device with sufficient processing power, memory and connectivity to be able to connect to the event unit 26 and interact with the event unit to perform event demand related activities as described below. Each computing device may also be a telephone system (using touch tone interactive systems) wherein the user is able to interact with the event demand system using the telephone system. In a preferred embodiment of the system shown in FIG. 1, the computing device may be a personal computer. The link 24 may be any communications link or network, such as a WAN, LAN, the Internet and the like with the link being the Internet (the world wide web) in a preferred embodiment of the invention. The event unit 26 may be any processor-based device that can perform the functions and operations of the event unit and may preferably be a server computer that is coupled to the link 24.

FIG. 2 is a block diagram of an example of the computing device 22 that is part of the event demand system in FIG. 1 The computing device 22 may include a display device 30 that permits the interested party to view the user interface screens of the event unit, a chassis 32 that houses various components of the system such as a processing unit 34, a persistent storage device 36 and a memory 37, such as SRAM or DRAM or flash memory, that are interconnected to each other as shown. When used to interact with the event unit, the memory may store an operating system 38 and browser application 40 that are executed by the processing unit. The browser application, such as for example Internet Explorer, connects to the event unit using a well known HTTP protocol over the link and permits the computing device and event unit to exchange data and information using the HTTP protocol and a series of web pages (examples of which are described below) to provide the user interface of the event demand system. The computing device may also have one or more input/output devices 42, such as the keyboard shown, that permit the interested party to interact with the user interface of the event demand system.

FIG. 3 is a block diagram of an example of a event main unit 26 that is part of the event demand system in FIG. 1. The event maim unit 26 may preferably be a typical server computer that has one or more processing units 50, one or more persistent storage devices 52 and a memory 54, such as SRAM or DRAM or flash memory, that are interconnected to each other as shown. When the server is used to perform the event demand functions, the memory may store an operating system (not shown), a web server software application 56 and an event demand software application 58 that are executed by the one or more processing units in order to implement the event demand functions. The web server application contains a plurality of lines of computer code that are executed by the one or more processing units in order to generate and serve the web pages to each computing device 22 that connects to the event unit so that the user interface of the event demand system is delivered to each interested party. The event demand application contains a plurality of lines of computer code that are executed by the one or more processing units that perform the various event demand functions of the system. The event demand functions may include 1) the generation of a user interface of the event demand system; 2) the interaction with each computing device; 3) the storage of information about each event demand including each interested party, details of the event and the like; 4) the process of generating a new demand; 5) the process of tabulating the demand for each existing demand; 6) the process of contacting an event provider once a particular demand reaches a certain level; and 7) delivering a sticker to an interested party wherein the sticker permits an interested party to be connected to the event demand website from any other website as described below in more detail.

The event demand system permits the interest (the demand) for an event for a particular location to be measured and then, when there is sufficient demand for the event at the particular location, communicate with the event provider. The life cycle of a demand may take several paths, but here are the two most common paths:

a. An interested party starts a demand and then spreads the word via email and over the web and offline, to get other interested parties to join the demand. Those other interested parties join the demand. Eventually the demand grows to the point where the event provider needs to be contacted if they're not already aware of the demand. The task of notifying the event provider may by done by the company that owns the event demand system, but it may also be automatically done by the event demand system Once the event provider is aware of the demand, they are encouraged to get involved and either indicate what the requirements would be for the event to take place, or, they indicate that they are not interested. If the event provider provides requirements, the demand continues to grow, and word continues to spread, until the event provider agrees to do the event, at which point the event provider and the demanders select a suitable venue, contact the venue, and schedule the event. At that point the event is announced on the event demand system (such as on a website associated with the event demand system such as www.eventful.com which is a commercial example of the event demand system) and is added to the events database portion of event demand system.

b. An event provider spreads the word on their own website(s), or on services such as Myspace, inviting interested party(s) to "demand" them in their specific cities, for events. The interested parties then begin starting new or joining existing demands for the event provider, and a national or international groundswell of demands pop up. The event provider keeps an eye on the demand, posting comments and interacting with the interested parties through the demands' detail pages' comment feature, and in time the event provider agrees to one or more of the demands and collaborates with the interested parties to arrange for venues and scheduled events.

For the interested parties, the event demand system is a new, convenient way to cause a desired event to happen by leveraging the power of the Internet, and creating a sufficient groundswell of public demand for an event that the chances of it actually coming about are greatly increased. For a event provider, the event demand system connects the public and a event provider directly together, enabling both parties to collaborate and cause desired events to happen. The event providers know exactly where there is public demand for them, anywhere in the world. With the event demand system, an event provider can dramatically reduce costs of promotion for an event, by shifting the promotion to the public itself wherein the public does the work of creating a campaign, getting people interested, and campaigning for the event to happen which reduces the cost of advertising substantially, as the audience is pre-defined. Therefore, the event provider's costs and risks are reduced, meaning the event provider can profit more from the event (or pass the savings on to the public, through lower ticket prices).

Figure 4:
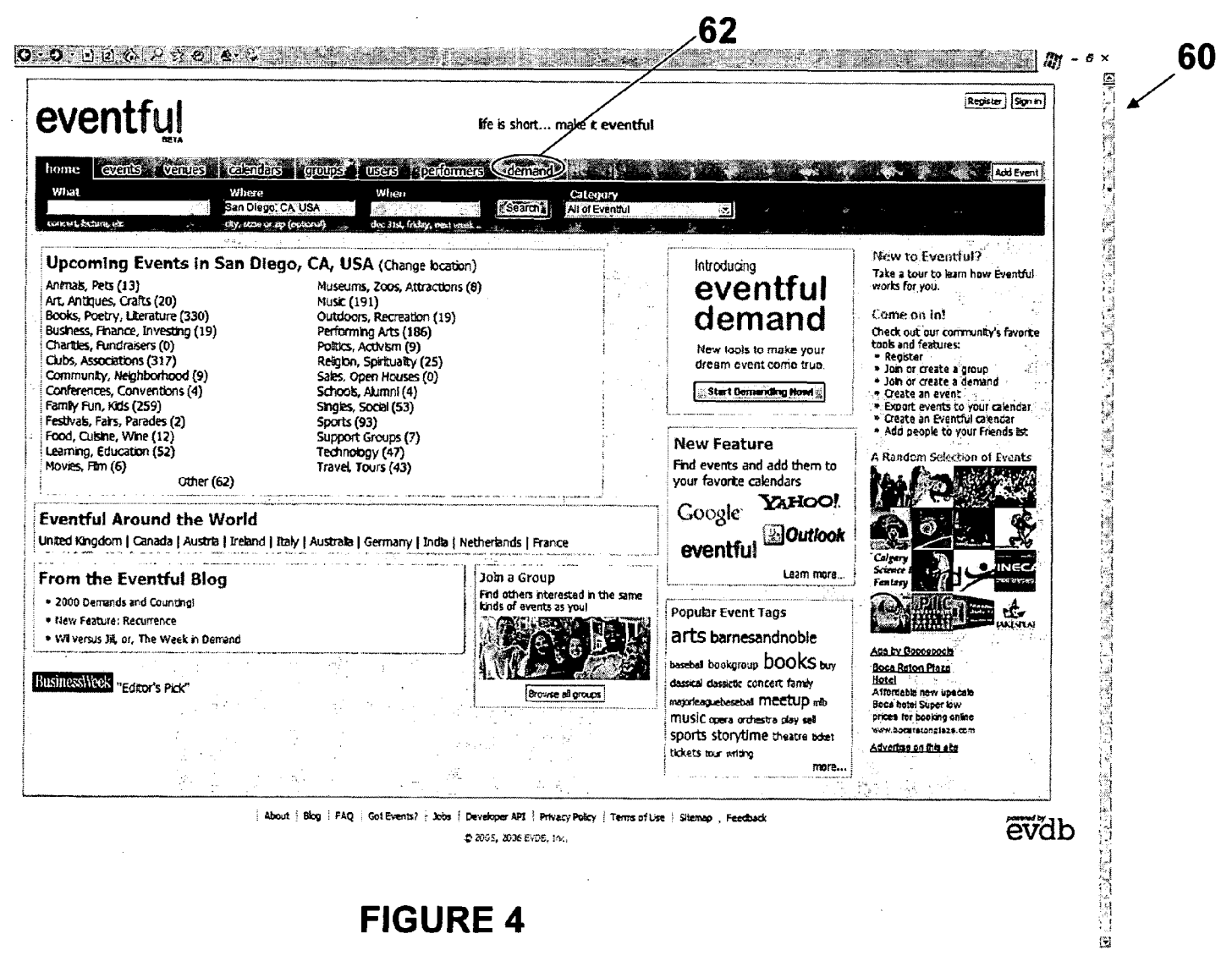

FIG. 4 is an example of a home page 60 of a web-based system that may include an event demand system. In this example, the web-based system is a web-site hosted by EVDB, Inc. with a web address of www.eventful.com. The website has information about various events, venues, calendars, performers and the like. In addition, the home page has a demand tab 62 that permits a user of the website to access the event demand functionality of the system. When the user selects the demand tab, a home page 70 of the event demand system is displayed to the user wherein the home page is preferably a web page downloaded to the user's computing device. The event demand home page 70 may include a demand search portion 72 that permits the user to search for a particular event in a particular location. The demand search portion appears in most of the demand event user interfaces and permit a user to type in a performer's name or an event name or some keyword, and the system then does a search and presents a list of matches wherein the list is similar in presentation to the other demand lists mentioned above. The home page 70 may also include a "my demands" tab 74, a "local" tab 76, a "hottest" tab 78, a "newest" tab 80, an "all" tab 82 and a "start a new demand" tab 84 each of which will be described in more detail below. In the example shown in FIG. 5, the hottest demands worldwide are displayed to the user wherein each event demand (such as the demand for a performance by Eric Michael Hopper in particular area) is shown. Each demand may have an image and information associated with demand, the one or more demands in the one or more geographic areas for the event, a demand summary portion 86 that displays the cumulative summary for the particular event demand and a "Demand It!" button 88 that permits each user to join in the particular event demand.

The my demands tab 74 causes a user interface to be generated that displays the list of all of the event demands that the particular user (who has accessed the my demands page) has started or already joined. This user interface is a handy way to keep track of the status of all of the demands that the user has shown interest in as an interested party. The list includes a photo image added when the demand was created (or if no image is available, but the demand is for a performer and the Eventful.com system has a stored image for the performer, then the performer image is used instead), the title of the demand (consisting of the name of the performer and the city they're being demanded in, or, the name of the event and the city it is being demanded in), the name of the user who created the demand and the date and time when it was created, a description of the demand, various links to see details about the demand, and finally, a number indicating how many people have joined the demand (similar to the demand summary 86 shown in FIG. 5) and a "Share It" button to spread the word about the demand (by definition, the button would not show "Demand it!" since the user has already joined or started all demands in this section of the site). When the user clicks on the "Share it" button, the user is shown a page to spread the word about that demand—via emails, via links posted to other sites, or via Event Demand Stickers which are described below in more detail.

Figure 5:
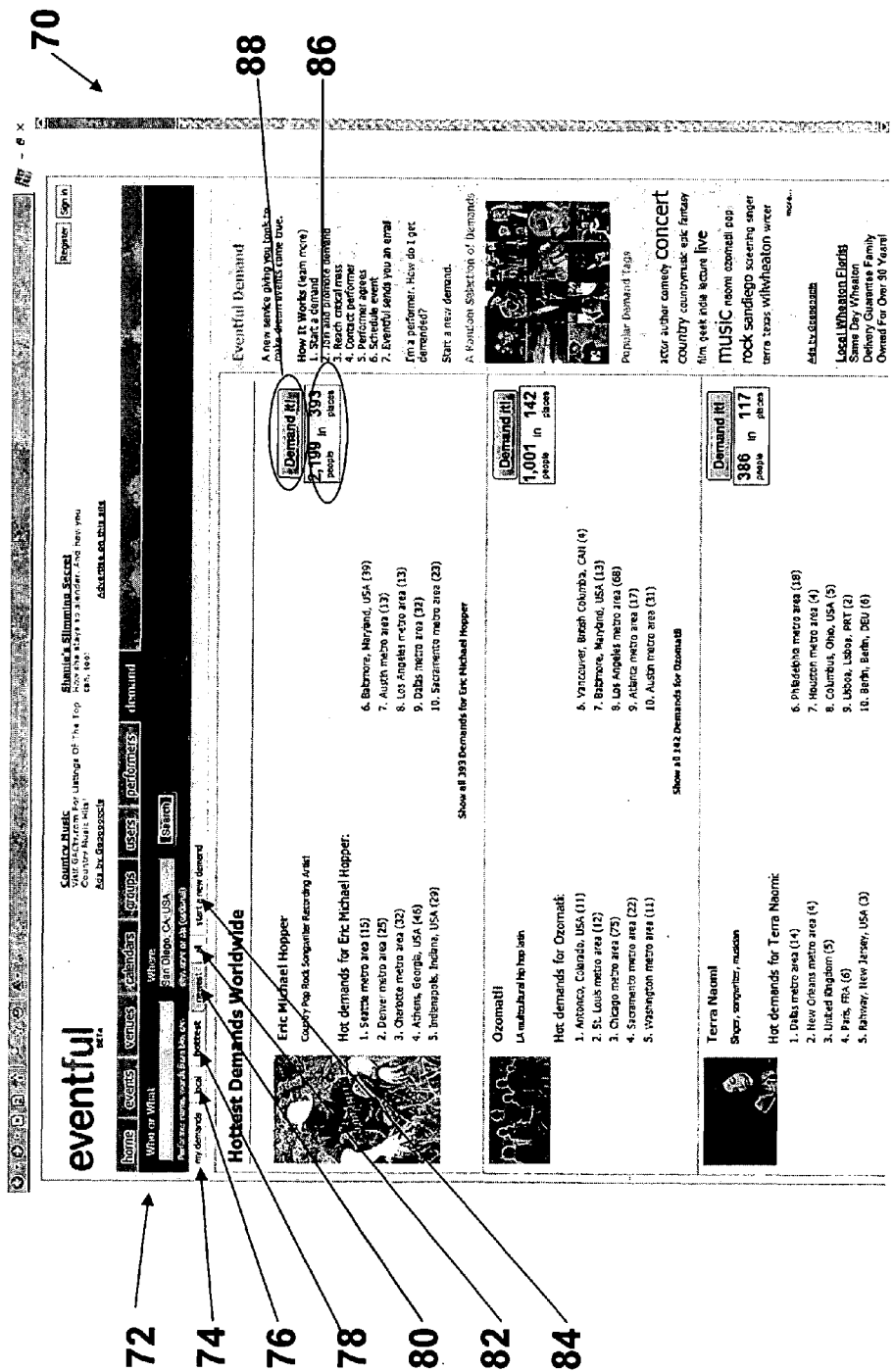
FIG. 5 is an example of a home page of the event demand system within the web-based system.
Figure 6:
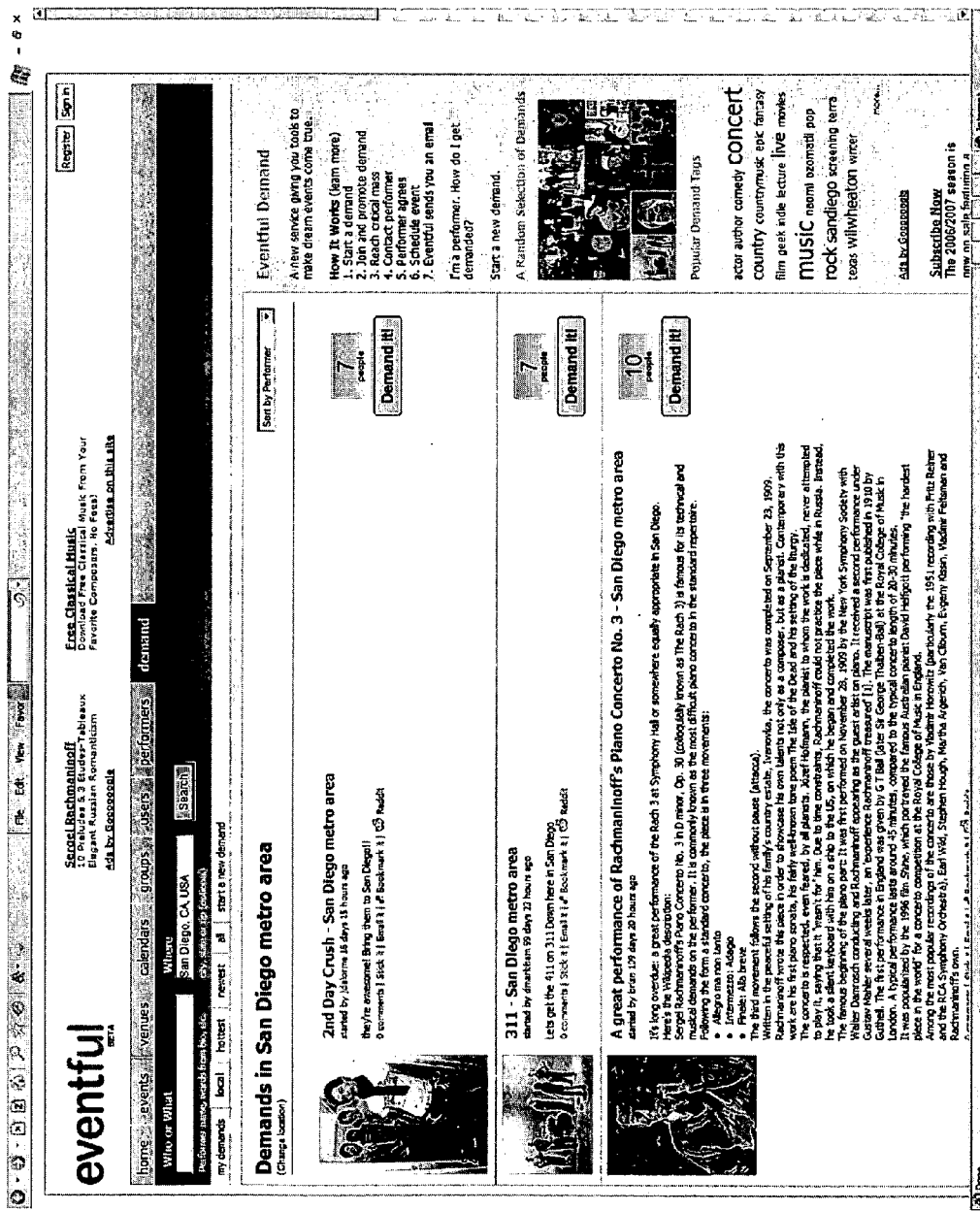
FIG. 6 shows an example of the local demand page of the event demand system.

The local demands tab 76 causes a user interface to be generated that displays a list (for the particular user (who might also be an interested party)) of all of the demands that have been started in a given local location. If the user is signed in when they access this section of the site, they will see local events where "local" has been either predetermined automatically by the system (by detecting the user's IP address) or by a user preference setting (the user set their location to a particular city). The attributes of the list are essentially the same as the list in My Demands, except this list shows all demands in a given location, whether you've joined or started them or not. Thus, instead of all of the demands having "Share it" buttons, many will say "Demand it" (See FIG. 5 that has the example) and ones you've already joined or started will say "Share it". FIG. 6 shows an example of the local demand page 90. The list of local demands may be sorted alphabetically by Performer/Event name or by the number of people in each demand (the biggest demands listed first).

The hottest demands tab 78 causes a user interface to be generated that displays a list (for the particular user (who might also be an interested party)) of all of the "hottest" demands as of that moment. An example of the hottest demands page is shown in FIG. 5. The list of the hottest demands has the same contents as the other demand lists set forth above. The "hottest" demands works similarly to "Weekly Top 40" in that "hotness" is a measure of the number of interested parties registered per unit time. The more interested parties that sign up in a given amount of time, the hotter the demand becomes. The time period for measuring the demand "hotness" is flexible, but may be, for example, two days. In a preferred embodiment, the "hottest demand" page is a list of the top 25 demands, sorted by "hotness".

The newest demands tab 80 causes a user interface to be generated that displays a list (for the particular user (who might also be an interested party)) of the most recently created demands, with the first one being the most recent, the next one being the second most recent, etc. The list of the newest demands has the same contents as the other demand lists set forth above.

The all demands tab 82 causes a user interface to be generated that displays a list (for the particular user (who might also be an interested party)) of all demands in the system. By default the demands are shown alphabetically. Like the other lists, it is broken down into multiple pages, which a user can browse through. The list may be sorted alphabetically by Performer/Event name, or by the number of people demanding (the biggest demands listed first). The list of the demands has the same contents as the other demand lists set forth above.

Figure 7:
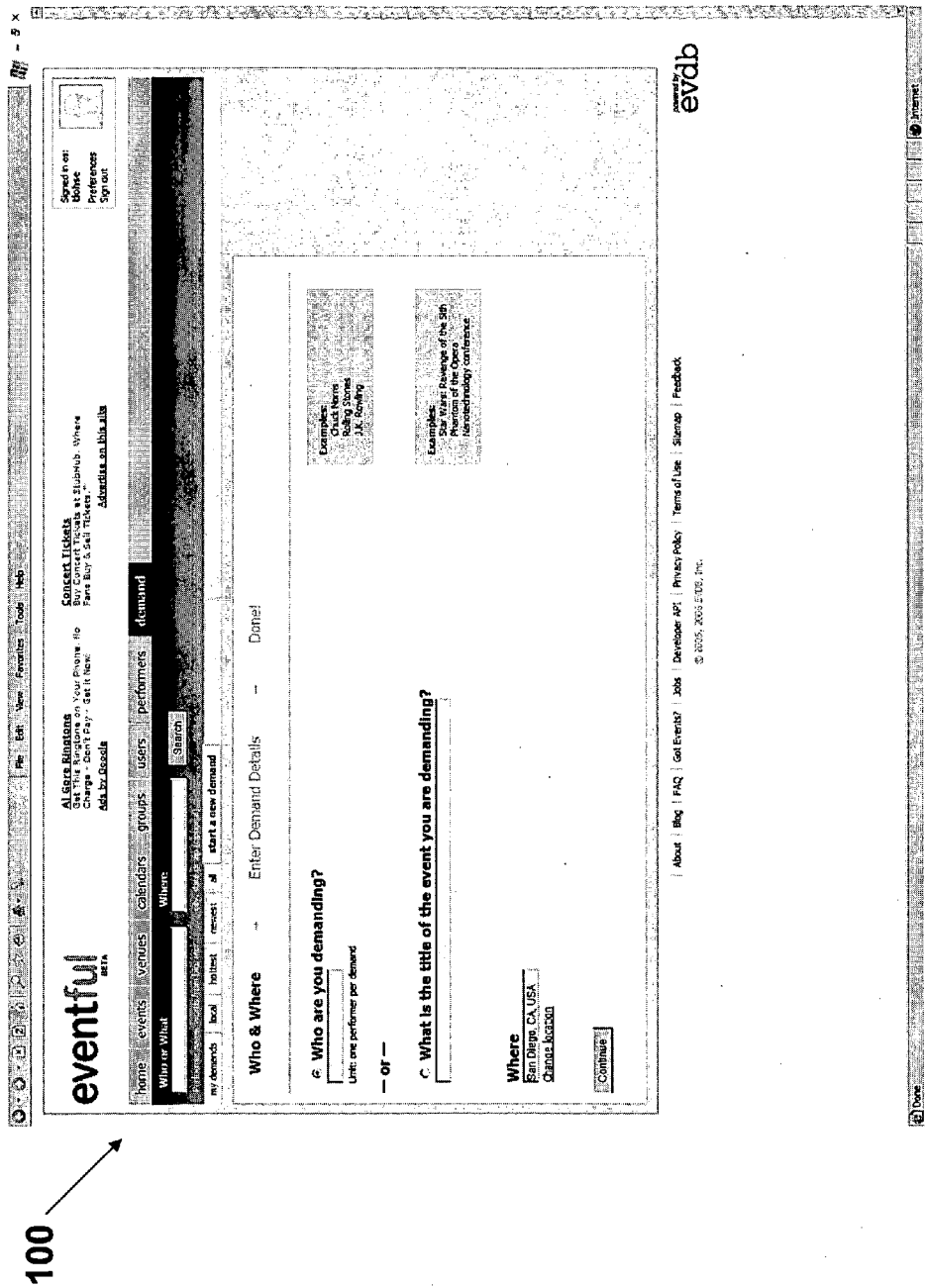
FIG. 7 illustrates an example of a user interface for creating a new demand using the event demand system.

The start a new demand tab 84 causes a user interface to be generated that displays a form that users can use to create a new demand. An example of a web page 100 with the form is shown in FIG. 7. The form asks the user to indicate whether they are demanding a specific performer, or, they're demanding a specific event that doesn't have a specific performer (for instance, a demand for a film screening). If the user indicates the former, then they are asked to enter the name of the performer. The system then searches to see if that name is already in the performer database. If the performer name is already in the performer database, the system presents the user with a list of possible matches, and asks the user to select from the list or create a new performer entirely. If no matches were found, the system lets the user create the new performer record, which consists of a name, a one-liner description, and tags or keywords that describe this performer (e.g. "musician," "singer," "author," "lecturer," "scientist"). An example of this step is shown in FIG. 7. The user is then asked to specify the location of the demand, and the system checks to see if the location is valid (typically a city name or city, state, country). If there are already one or more demands for that performer in that city, the user is encouraged to join an existing demand rather than creating a new one, unless the new one is asking the performer to do something different than the other demands. If the user indicated that the user is demanding an event and not a performer, the process is essentially the same in that the user specifies the event, the system searches to see if it already exists or not, and then the system verifies the location.

Once the performer/event and location are specified, the system then asks the user to provide a detailed, compelling description of the event (this is, after all, a "campaign" and it needs to be as persuasive as possible), one or more descriptive tags, and an image if available. Once the user enters the new demand or joins an existing demand, the user becomes an interested party who is interested in the particular event. Once the demand is created, the creator is then urged to spread the word via email, links, and demand Stickers.

Figure 8:
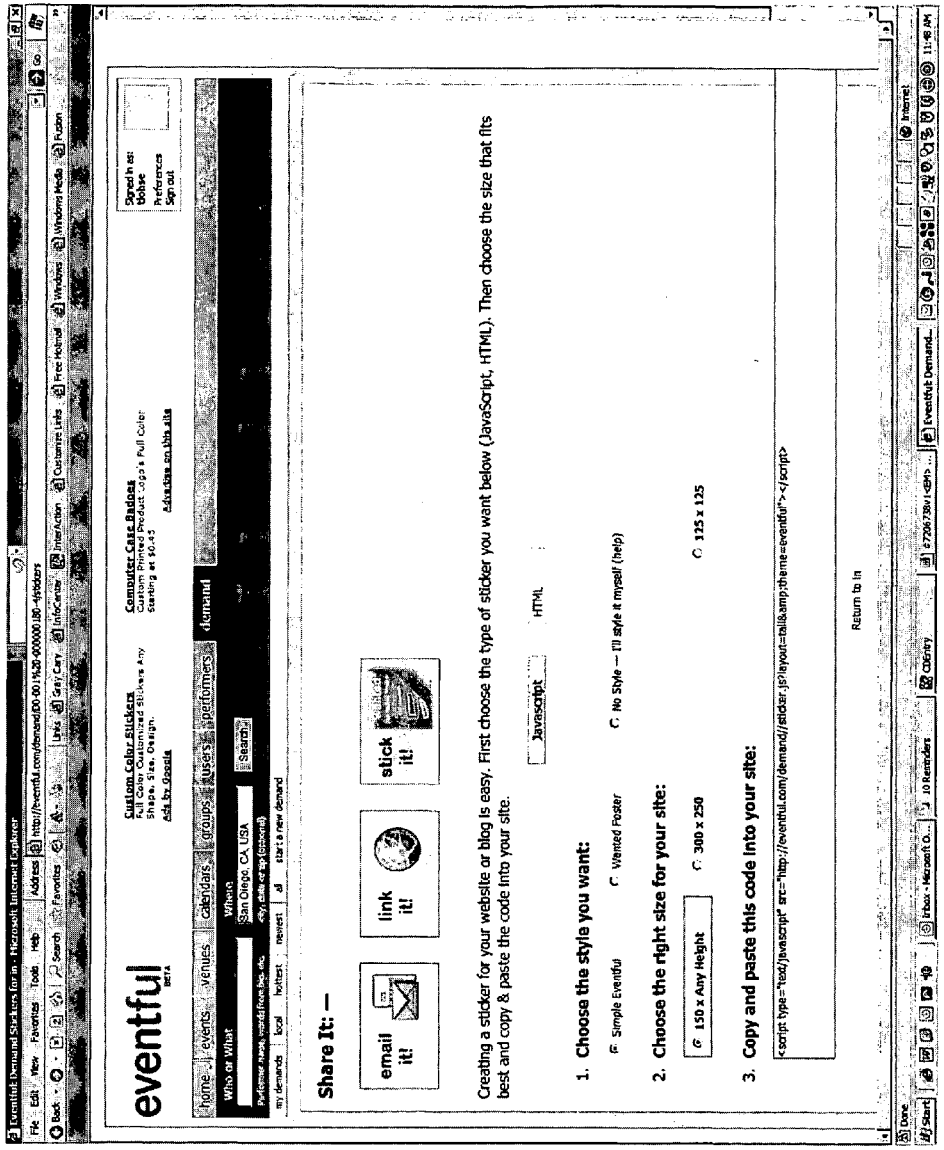
FIG. 8 illustrates an example of a user interface that permits an interested party to share or increase the demand for an event.
Figure 9:
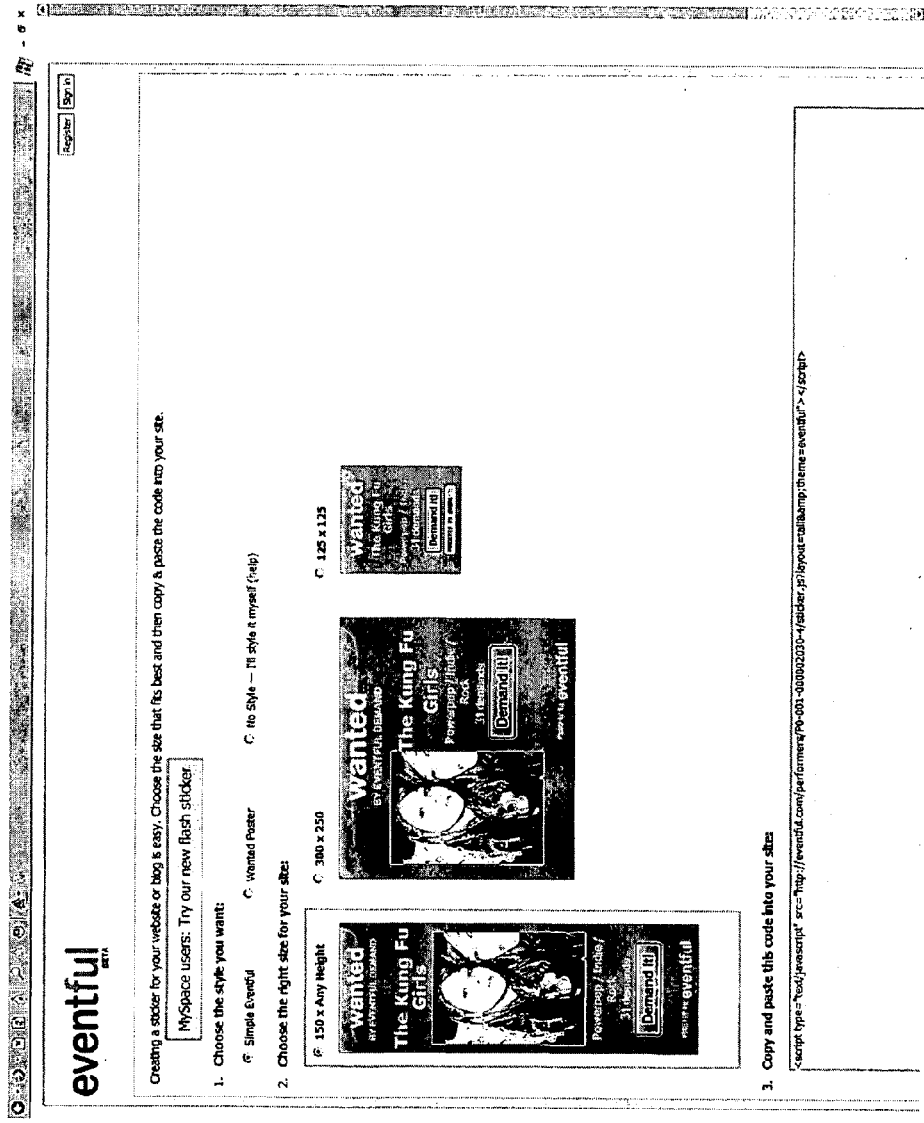
FIG. 9 illustrates an example of a user interface for selecting a demand sticker and its characteristics.

FIG. 8 illustrates an example of a web page 110 that permits the interested party to share or increase the demand for an event (a Demand It! Sticker or a Share It! Sticker) and FIG. 9 illustrates an example of a web page 120 for selecting a demand sticker and its characteristics. As shown in FIG. 8, the interested party may select a method for sharing the demand by using email (to send an email to other potential interested parties), a link (to place on a website or blog so that users can access the event demand system) or a demand sticker (which can also be placed on a website of blog and users can then access the event demand system by clicking on the sticker. In a preferred embodiment of the invention, each of these options may be implemented with a piece of code that performs the functions described. When the sticker is chosen by the interested party, the user interfaces then permit the user to select one or more characteristics of the sticker such as the type of code used for the sticker (javascript, Flash or HTML code for example), the style of the sticker, the size of the sticker and the code to be inserted into the other website or blog to enable the demand sticker functionality. Thus, the stickers are snippets of code that users can copy and paste onto their web pages or blogs which results in a graphical "badge" often similar in size and shape to a graphical advertisement, often placed in a column or sidebar of the page it's being embedded in. The stickers allow interested parties to increase the demand for a particular event at a particular location by placing the stickers on other websites and blogs.

The stickers may include a performer sticker which is shown in FIG. 9. These are special stickers ideal for performers to advertise to their fans that they should "demand" the performer in any given city. These stickers are more generic stickers in that they advertise the performer's name, show an image if available, and offer a "demand it" call to action. The system may also generate calendar stickers and group stickers, etc.

Figure 10:
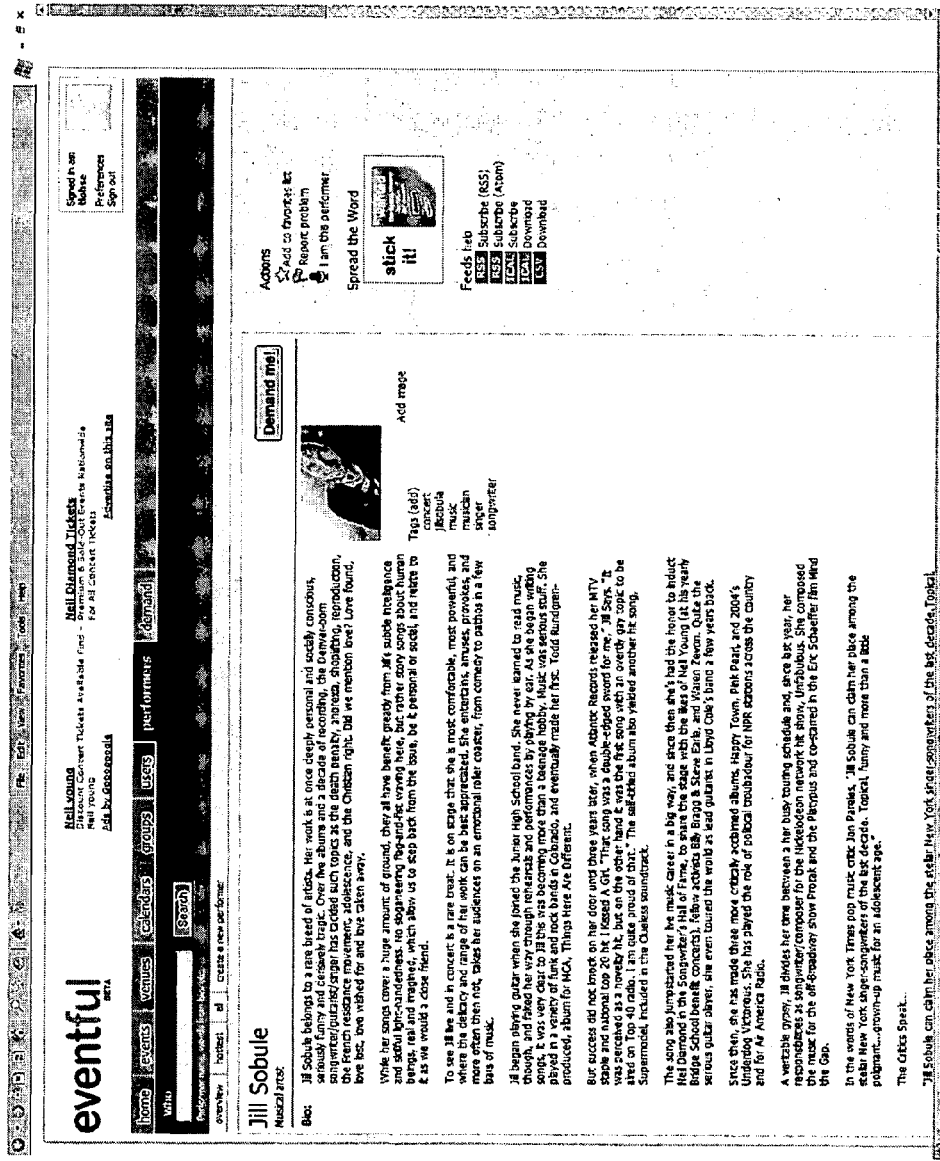
FIG. 10 illustrates an example of an event provider detail page.

The event demand system may also include an event provider detail page as example of which is shown in FIG. 10. These pages provide summary information about a given event provider, such as a performer, including: one-liner description; detailed bio; list of tags, one or more images; a list of known upcoming events already scheduled; a list of demands for this performer; a button enabling users to demand this performer; and facilities for users to post comments about this performer. There are also RSS and iCalendar feeds for users to download or subscribe to information about this performer.

Figure 11:
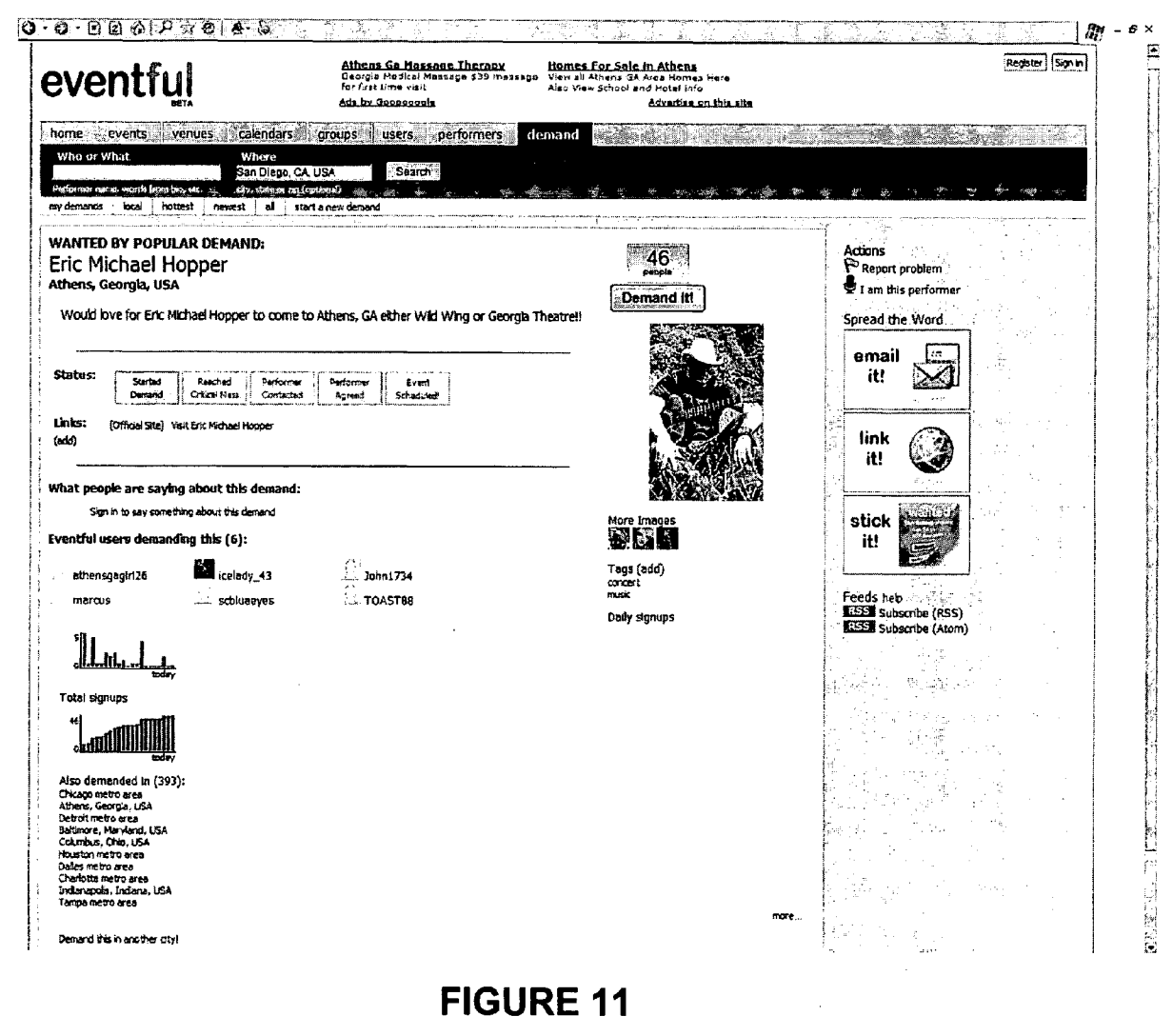

FIG. 11 illustrates an example of a demand detail page that provides summary information about a particular demand, including: the title of the demand; description; one or more images; tags; statistical graphs showing the number of people joining over the past 30 or so days, and the cumulative count over the past 30 or so days; comments; and tools to spread the word via email, links, or by creating Stickers for this demand. As with the other pages, this page has a Demand It! button if the user has not already joined this demand already, or a "Share it" button if the system knows that the particular user is already an interested party and joined the demand. If the event provider is registered with the event demand system, and has associated their user account with the event provider record, then the event provider can post comments on an demand detail page and the comments will be specially highlighted so users see that the actual performer is participating in the conversation.

The event demand system may also have an Email It page which is a tool that allows the interested party to email a demand to a list of email addresses. The Email It page also lets the interested party customize the email by letting the interested party to generate unique text for the email. The tool permits the system send the emails, or, if the browser is configured correctly, the interested party can click link and launch the email client and send the email. The goal of this page is to get the interested party to spread the word via email about a demand. Similarly, the Link It page helps users spread the word about a demand and provides the tools to embed links on other websites links back to the demand on the event demand system.

Figure 12:
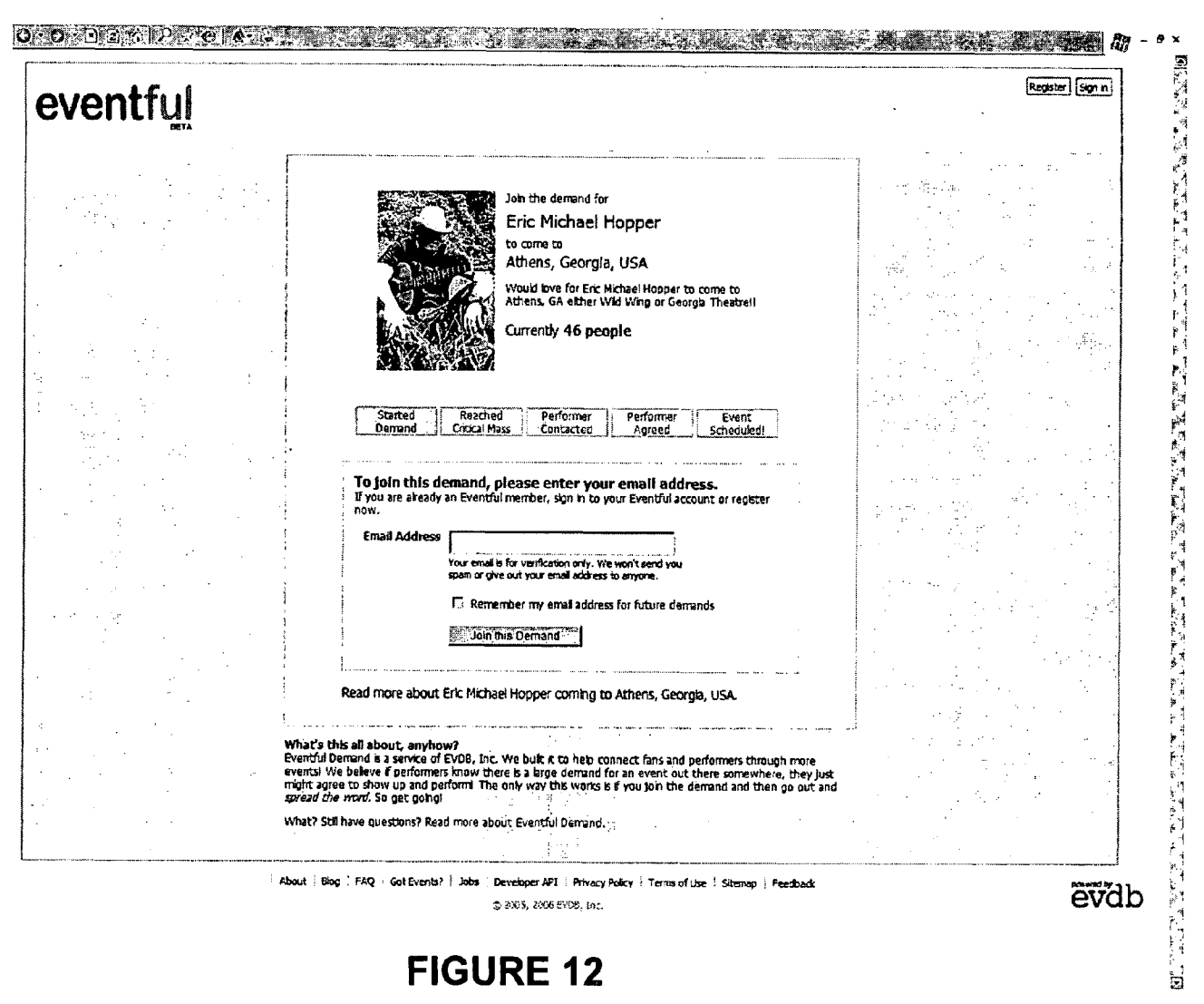

The event demand system also has a demand join page (see FIG. 12 for an example of a demand join page.) The demand join page is shown to the user when the user clicks on a "Demand it!" button from a sticker located on the web. The page gets the user to join the demand for the particular event in the particular location by typing in the user's email address so that the user becomes an interested party for the event demand. The system then sends the interested party a validation/confirmation email with the user not considered to be a member of the demand until the user has clicked on the link inside the email message that's sent to them. When they click on the link, the interested party is sent back to the site where they see the "thank you for joining" page and where the interested party is encouraged to spread the word and get others to join as well.

The event demand system may notify an interested party (or the group of interested parties) via email when certain actions occurs with respect to an event demand to which the interested parties are subscribed. For example, the event demand system may notify each interested party when a critical mass for the event is achieved. The critical mass is a subjective number of interested parties, determined by the event provider, that represents the minimum number of demandees which is required before the event provider will consider doing the event. The system may also send out a message when the event provider agrees to the demanded event at the particular location. This message may be used to solicit feedback from interested parties about what venue should be selected for the event, when it should be scheduled, or other planning details about the proposed event. The system may also send out a message to all interested parties when the event is scheduled wherein the message encourages the interested parties to attend the event, indicate that they are going to the event, and generally encourage their friends to attend the event.

The event demand system may also include administrator tools available to the event demand system that support hooking up a user name with a performer record, changing the state of a demand ("critical mass", "event scheduled", etc.), sending emails to list members, etc. The hooking up of the user name with the event provider record (in the database associated with the event demand system) permits the event provider to talk directly to their fans through event, demand and performer comments. The state of a demand can be moved between one of the following states: Started Demand, Reached Critical Mass, Performer Contacted, Performer Agreed and Event Scheduled. The message to interested parties may be generated by the system, such as when an event state changes. The administrator tools also permit an authorized user to, when an actual event is scheduled to satisfy a demand, enter the event ID of the event that satisfies the demand which causes the demand page to list the scheduled event prominently.

The event demand system may also permit a user/interested party to create a demand for an event that includes multiple event providers, such as a demand that Bono of U2 and Pete Townsend of The Who come to a particular university and discuss and debate the current state of music today. The event demand system may further include a performer dashboard that is a set of tools that enable a performer to better manage their demands, their event calendars, and all other information about them on the event demand system wherein these tools may include one or more of: current status of each demand for the performer; recommended actions; manage available dates for performances; specify venue/city preferences, requirements for performing; specify a minimum number of people or dollar amount for an acceptable demand; manage communications with demanders; pay to send communications to all fans (e.g., promos, discounts); and tools for adjusting rules for specific or for all demands for the performer.

The event demand system may further include various venue tools. For example, the system may include a tool for a particular venue to be able to register to be selected as a venue for a particular event. The system may also include tools for enabling venues to start demands manage them similar to performers (e.g., "the Belly Up Tavern would like to demand an acoustic show put on by Jackson Browne—sign up to help make this happen"). The system may also include tools for fans and performers to "vote" on which venue is best for a demanded event.

The system may also provide tools for sponsors to start demands and promote them to fans, performers, and venues. The sponsors would pay the event demand system and probably the performer as well for the sponsorship. The system may also sell sponsorships for demands that already exist, and offer sponsors the sponsorships of the actual events if they come about. For the example of the system shown in FIG. 4, the event demand system may include cross-promotion across the system so that, for example, when searching or browsing for events in Phoenix, Ariz., the system shows the current hottest demands in Phoenix. As another example, on Event Detail Pages, if there are one or more performers associated with the event, offer buttons to Demand those performers for new events. The system may also include a tool to enable event providers, venues, and interested parties to print out posters of demands, to spread the word in the physical world. The system may also have a tool that generates a heat map that graphically shows users/interested parties and event providers where there is demand (in total or for specific events or performers), across the whole world, or in a specific country, or in a particular state/province/city. The system may also include tools that enables users/interested parties to browse demands geographically by category (e.g., see only music demands in San Diego, or film screening demands in NYC, etc).

When an existing user of the system shown in FIG. 4 demands a particular event provider who is a performer, the user visits the Start a Demand page, specifies a performer and a location (city, metro area, Joe's Bar & Grill, etc.), provides a description for the demand, and then the demand is created. A user must be a registered user of the event demand system before the user can create a demand. Performers are specified by searching a performers database. If the desired performer is found, it is simply selected. If the performer is not already in the database, the performer is automatically added. After the demand is created, the user is prompted to help promote the demand by emailing their friends, putting up a demand "sticker", and linking to the demand on web pages, blog comments, etc. This same process flow occurs when a user creates a demand for an event, such as a film screening, play, conference, instead of a human performer.

The system provides a process by which an event provider, such as a performer, can solicit demands for themselves and there are several tools available to the performer to help in this regard. First, the performer should check for and if necessary create a performer data record on the event demand system. Once the performer has a performer page, the performer should get in touch with event demand system staff via email or phone so we can connect their username with their performer ID which allows the performer to communicate with users on the event demand system and be officially identified as the performer. Comments on events and demands for that performer are identified by a special "performer" icon, and include special color highlighting to indicate that this message is from the performer. The system allows a performer to communicate with their fan base using their blog, website or email list and ask the fans to go to the event demand system and demand the performer. Another tool available to performers is the Performer Sticker which are similar to Demand stickers, but encourage users to demand the performer in their own city.

A user is asked to join a demand by visiting the event demand system or by hearing about the demand through email, a news story, a sticker on a website they frequent, a mention in a blog or website, or even by word of mouth. The preferred method for asking the user to join the demand is the "Demand It!" button that was described previously. If the user is a logged in system user, the user can join a demand with a single click that does not interrupt the user's browsing. For example, if the demand was presented in the form of a sticker on a 3rd party website, the user does not leave the website when the user joins a demand since the button simply changes from "Demand it!" to "Share it!", indicating that the demand request has been made. Obviously, the user still has the opportunity to then click (leaving the website) to go to event demand system where they can learn more about the demand, email all their friends, create their own demand sticker, etc.

If the user is not a logged in system user, the user is taken to a form on the system website (an example is shown in FIG. 12) where they are asked to enter their email address. After they submit their email address, they are taken to a "Thank You" page noting that they will receive a confirmation email that they will need to respond to for their demand to be officially counted. The email is sent immediately after they submit their email address, so the turn-around time on acknowledging the demand is typically very short. When the user clicks the "confirm" link in the confirmation email, they are taken back to the demand detail user interface on the event demand system where they are thanked for joining the demand, and given the opportunity to email all their friends and ask them to join too. When a user is asked for their email address, they have the opportunity to check a checkbox saying "Remember my email address for future demands". If the user checks the checkbox, their email address is remembered in an HTTP cookie on the user's computer. Once the email is saved, the user experience is identical to a logged-in user so that their next demand registration is handled via a single click mechanism described above.

When a new system user wishes to register as a system user, the user clicks on the "Register" link in the system website header or they may be prompted to register when they attempt to perform some action (such as creating a demand) that requires registration. During registration, the user inputs a username, password choice (specifying the password twice for verification) and a valid email address. If the username is not already taken by another user, and if the two password strings match, the user is entered in the Users database, and then automatically logged in to the event demand system. If the username is already taken by another user, the new user is prompted to choose a different username along with a list of possible usernames that are not already taken. If the password strings do not match, the user is prompted to correct the mistake.

While the foregoing has been with reference to a particular embodiment of the invention, it will be appreciated by those skilled in the art that changes in this embodiment may be made without departing from the principles and spirit of the invention, the scope of which is defined by the appended claims.

The invention claimed is:

1. A computer-implemented method for creating a demand for an event at a particular location, the method comprising:
creating, by an interested party on an event demand system, a demand for an unscheduled event in a particular geographic area, the demand being an indication of interest for the unscheduled event;
providing notice of the demand on the event demand system;
electronically dispersing, by the interested party to third parties via GUI functionality, a request to join the demand;
electronically dispersing, to persons other than the interested party and the third parties via a user interface page of sharing tools, a request to join the demand;
allowing a party to join in the demand by selecting a demand button;
receiving at the event demand system a notification of each instance of a party joining the demand;
determining, via a computer of the event demand system, when the number of instances of a party joining the demand reaches a critical mass;
contacting, upon determination that the critical mass has been reached, the event provider;
providing the event provider with the interested parties who demanded the event at the particular location via administrator tools, the administrator tools including the sharing tools and 2 or more tools directed to features selected from the group composed of: current status of each demand for a performer, manage available dates for performances, specify venue/city preferences or requirements for performance, specify a minimum quantity of people or monetary amount for an acceptable demand, manage communications with demanders, pay to send communications to fans, and/or adjusting rules for specific demands or for all demands for the performer;
transmitting an event-scheduled message to the interested parties when the demanded event is scheduled, the event-scheduled message including information that encourages the interested parties to attend the event, that allows the interested parties to indicate their interest in attending the event, and/or that enables the interested parties to encourage their friends to attend the event; and
receiving a response from an interested party who received the event-scheduled message, the response including an indication of the interested party's interest in attending the event.

2. The method of claim 1, wherein the request to join the demand further comprises one of locating the demand button on the event demand system for the demand, sending an electronic message to a plurality of users, posting a link on a plurality of other sites that link to the demand on the event demand system, and posting a sticker on a plurality of other sites that link to the demand on the event demand system.

3. The method of claim 2, wherein the sticker further comprises a piece of code that is placed on the plurality of other sites.

4. The method of claim 1, wherein the event further comprises one of musical concerts, a sporting event, a vote/tally, a book reading, an appearance by a particular person, a gathering of a particular group of people with an interest in particular subject, a particular action, a film screening, airing of television programming, airing of radio programming, airing of cable programming, and any other activities in a particular location.

5. The method of claim 4, wherein the event provider further comprises one of a band, an organizer of an event, an author, an venue owner, a film distributor, television broadcaster, cable station, radio broadcaster, an athlete, a musician, a speaker, an industry leader, a comedian, a poet and a personality.

6. A system for creating a demand for an event at a particular location, the system comprising:
a demand storage unit that stores one or more pieces of data about a plurality of demands, each demand being an event by an event provider at a particular location; and
an event demand computer system having:
a demand creation module that permits an interested party to create a demand for an event wherein the created demand is an indication of interest for an unscheduled event that is scheduled if the event provider agrees to the demanded event wherein the scheduling includes selecting a venue and selecting a time for the event and wherein the created demand is stored in the demand storage unit;
a demand join unit that electronically disperses a request to join the created demand from the interested party to third parties and by persons other than the interested party and the third parties and allowing a party to join the demand;
a notifier unit that automatically provides an event provider of the created demand with the interested parties who demanded the event at the particular location;
administrator tools including a performer dashboard, which provides a display of recommended actions provided via the event demand computer system, and 2 or more tools directed to features selected from the group composed of: current status of each demand for a performer, manage available dates for performances, specify venue/city preferences or requirements for performance, specify a minimum quantity of people or monetary amount for an acceptable demand, manage communications with demanders, pay to send communications to fans, and/or adjusting rules for specific demands or for all demands for the performer; and
non-transitory computer readable media comprising instructions executable by one or more processing components and/or circuits to transmit an event-scheduled message to the interested parties when the demanded event is scheduled, the event-scheduled message including information that encourages the interested parties to attend the event, that allows the interested parties to indicate their interest in attending the event, and/or that enables the interested parties to encourage their friends to attend the event, and to receive a response from an interested party who received the event-scheduled message, the response including an indication of the interested party's interest in attending the event;
wherein the event demand computer system is configured to provide information regarding a quantity of demands in one or more geographic areas and determine when a number of instances of a party joining the demand reaches a critical mass.

7. The system of claim 6, wherein the demand join unit further comprises a piece of code for locating a demand it button on the event demand computer system for the created demand, a piece of code for sending an electronic message to a plurality of users about the created demand, a piece of code for posting a link on a plurality of other sites that link to the created demand on the event demand computer system and a piece of code for posting a sticker on a plurality of other sites that link to the created demand on the event demand computer system.

8. The system of claim 7, wherein the sticker further comprises a piece of code that is placed on the plurality of other sites.

9. The system of claim 6, wherein the event further comprises one of musical concerts, a sporting event, a vote/tally, a book reading, an appearance by a particular person, a gathering of a particular group of people with an interest in particular subject, a particular action, a film screening, airing of television programming, airing of radio programming, airing of cable programming, and any other activities in a particular location.

10. The system of claim 9, wherein the event provider further comprises one of a band, an organizer of an event, an author, an venue owner, a film distributor, television broadcaster, cable station, radio broadcaster, an athlete, a musician, a speaker, an industry leader, a comedian, a poet and a personality.

11. A computer-implemented method for creating a demand for an event, the method comprising:
creating, by an event provider utilizing an event demand computer system, a demand for an event by the event provider at one or more locations, the demand being an indication of interest for an unscheduled event that is scheduled if the event provider agrees to the demanded event wherein the scheduling includes selecting a venue and selecting a time for the event;
electronically dispersing, via administrator tools the event demand computer system, a request to join the demand for the event by the event provider;
allowing a party to join in the demand for the event by selection of a demand button;
receiving at the event demand system a notification of each instance of party joining the demand for the unscheduled event;
providing the event provider with a measure of the demand created by the one or more interested parties who demanded the event at each location, wherein the measure includes a quantity of the interested parties who demanded the event;
determining, via a computer of the event demand system, when the number of instances of a party joining the demand reaches a critical mass, wherein the critical mass is a subjective number of interested parties, determined by the event provider, that represents the minimum number of demandees required before the event provider will consider doing the event;
distributing an event-scheduled message from the event demand system to the interested parties when the demanded event is scheduled, the event-scheduled message including information that encourages the interested parties to attend the event, that allows the interested parties to indicate their interest in attending the event, and/or that enables the interested parties to encourage their friends to attend the event; and
receiving a response from an interested party, the response including an indication of the interested party's interest in attending the event;
wherein the administrator tools including a performer dashboard, which provides a display of recommended actions provided via the event demand computer system, and 2 or more tools directed to features selected from the group composed of: current status of each demand for a performer, manage available dates for performances, specify venue/city preferences or requirements for performance, specify a minimum quantity of people or monetary amount for an acceptable demand, manage communications with demanders, pay to send communications to fans, and/or adjusting rules for specific demands or for all demands for the performer.

12. The method of claim 11, wherein the request to join the demand further comprises one of locating the demand button on the event demand system for the demand, sending an electronic message to a plurality of users, posting a link on a plurality of other sites that link to the demand on the event demand system, and posting a sticker on a plurality of other sites that link to the demand on the event demand system.

13. The method of claim 12, wherein the sticker further comprises a piece of code that is placed on the plurality of other sites.

14. The method of claim 11, wherein the event further comprises one of musical concerts, a sporting event, a vote/tally, a book reading, an appearance by a particular person, a gathering of a particular group of people with an interest in particular subject, a particular action, a film screening, airing of television programming, airing of radio programming, airing of cable programming, and any other activities in the particular location.

15. The method of claim 14, wherein the event provider further comprises one of a band, an organizer of an event, an author, an venue owner, a film distributor, television broadcaster, cable station, radio broadcaster, an athlete, a musician, a speaker, an industry leader, a comedian, a poet and a personality.

16. A system for creating a demand for an event, the system comprising:
a demand storage unit that stores one or pieces of data about a plurality of demands, each demand being an event by an event provider at one or more locations; and
an event demand computer system having:
a demand creation module that permits an event provider to create a demand for an event wherein the created demand is an indication of interest for an unscheduled event in a geographic location, wherein the event is scheduled if the event provider agrees to the demanded event wherein the scheduling includes selecting a venue and selecting a time for the event and wherein the created demand is stored in the demand storage unit,
a demand join unit that electronically disperses a request to join the created demand, by the event provider and by persons other than the event provider,
a notifier unit that provides the event provider with one or more interested parties who demanded the event at each location and distributing electronic messages from the event provider to the interested parties when the one or more interested parties exceeds a critical mass; and
non-transitory computer readable media comprising instructions executable by one or more processing components and/or circuits to transmit an event-scheduled message to the interested parties when the demanded event is scheduled, the event-scheduled message including information that encourages the interested parties to attend the event, that allows the interested parties to indicate their interest in attending the event, and/or that enables the interested parties to encourage their friends to attend the event, and to receive a response from an interested party who received the event-scheduled message, the response including an indication of the interested party's interest in attending the event;
wherein the event demand computer system includes administrator tools including a performer dashboard, which provides a display of recommended actions provided via the event demand computer system, and 2 or more tools directed to features selected from the group composed of: current status of each demand for a performer, manage available dates for performances, specify venue/city preferences or requirements for performance, specify a minimum quantity of people or monetary amount for an acceptable demand, manage communications with demanders, pay to send communications to fans, and/or adjusting rules for specific demands or for all demands for the performer.

17. The system of claim 16, wherein the demand join unit further comprises a piece of code for locating a demand it button on the event demand computer system for the created demand, a piece of code for sending an electronic message to a plurality of users about the created demand, a piece of code for posting a link on a plurality of other sites that link to the created demand on the event demand computer system and a piece of code for posting a sticker on a plurality of other sites that link to the created demand on the event demand computer system.

18. The system of claim 17, wherein the sticker further comprises a piece of code that is placed on the plurality of other sites.

19. The system of claim 16, wherein the event further comprises one of musical concerts, a sporting event, a vote/tally, a book reading, an appearance by a particular person, a gathering of a particular group of people with an interest in particular subject, a particular action, a film screening, airing of television programming, airing of radio programming, airing of cable programming, and any other activities in a particular location.

20. The system of claim 19, wherein the event provider further comprises one of a band, an organizer of an event, an author, an venue owner, a film distributor, television broadcaster, cable station, radio broadcaster, an athlete, a musician, a speaker, an industry leader, a comedian, a poet and a personality.

* * * * *